July 4, 1967 W. L. L. LENDERS 3,329,358
COIL WINDING MACHINE
Filed Feb. 10, 1966 4 Sheets-Sheet 1

INVENTOR.
WILHELMUS L.L. LENDERS
BY
*Frank R. ...*
AGENT

July 4, 1967  W. L. L. LENDERS  3,329,358
COIL WINDING MACHINE
Filed Feb. 10, 1966  4 Sheets-Sheet 3

INVENTOR.
WILHELMUS L.L.LENDERS
BY
Frank R. Trifari
AGENT

United States Patent Office 3,329,358
Patented July 4, 1967

3,329,358
COIL WINDING MACHINE
Wilhelmus Leonard Louis Lenders, Emmasingel, Eindhoven, Netherlands, assignor to North American Philips Company, Inc., New York, N.Y., a corporation of Delaware
Filed Feb. 10, 1966, Ser. No. 526,619
Claims priority, application Netherlands, Feb. 20, 1965, 6,502,165
7 Claims. (Cl. 242—9)

ABSTRACT OF THE DISCLOSURE

This disclosure involves a coil winding machine in which a motor drives a shaft which is separately connected to both a gear mechanism and a coil former support. A coil former is attached to the support and coil wire is caused to be wound thereon by a cam and guide means which are driven by the gear mechanism.

---

The invention relates to a machine for winding universal wound coils.

For universal wound coils the desired winding pattern is obtained by moving a wire guide to and fro relative to a coil former while the coil former is rotating. In order to wind consecutive turns side by side at the desired distance from each other on the coil former, the transmission ratio between the driving shaft of the coil former and a mechanism controlling the wire guide must deviate slightly from the transmission ratio determining the winding pattern, which may be 1:1 or 1:2. The distance between the center lines of two consecutive turns, measured along a circle at right angles to the center line of the coil and passing through the turns, is termed the "winding step." The electrical properties, for example, the natural capacitance of a universal wound coil depend, for a considerable part, upon the size of this winding step. In a universal coil winding machine it is therefore desirable to be able to select the number of "winding steps." It is known to adjust the transmission ratio between a main shaft and the wire guide by means of toothed change-speed wheels. In the known winding machines, however, a large range of adjustments of the "winding step" requires a large number of change-speed wheels or gears.

The invention has for its object to provide a universal coil winding machine in which the transmission ratio between the main shaft and the wire guide can be adjusted very rapidly and accurately without a large number of change-speed wheels as required with the known machines. According to the invention, the transmission between the main shaft and the cam disc controlling the wire guide comprises a driving gear having a fixed transmission ratio and a speed-control member having a comparatively narrow control-range and comprising a mechanism which imparts to the output shaft of the speed control member during substantially half of each revolution of said shaft an angular displacement which is accurately equal to the angular displacement of a driving member for the speed-control member, said mechanism superimposing an angular displacement of adjustable value on said angular displacement of the output shaft during another part of each revolution. The pattern-determining transmission ratio, which has a simple value, for example 1:1 or 1:2, may be adjusted by means of toothed wheels or sprockets. The desired size of the winding step is selected by means of the speed-control member. The speed-control member of this kind is fairly simple in construction and operates substantially independently of the load. Deviations due to slipping parts can only occur during a small part of each revolution. The transmission ratio of this speed-control member, in contrast to other speed-control members, does substantially not exhibit deviations from the adjusted value. Therefore, the machine according to the invention permits of winding coils with a very small wire diameter in an extremely accurate manner.

In a preferred embodiment, the machine according to the invention comprises a speed-control member having a rotatable rod system as described hereinafter in detail.

As an alternative embodiment of the invention the speed-control is formed by a differential mechanism as described in detail hereinafter.

In accordance with the invention, it is advantageous to have the coil former rigidly secured to the main shaft so that any play between the coil former and the wire guide is avoided, and thus a wire of very small diameter can be wound to form a universal wound coil without the risk of disturbance during the winding operation causing the wire to break.

The above and other features, objects and advantages of the present invention will be fully understood from the following description considered in connection with the accompanying illustrative drawings.

Figure 1:
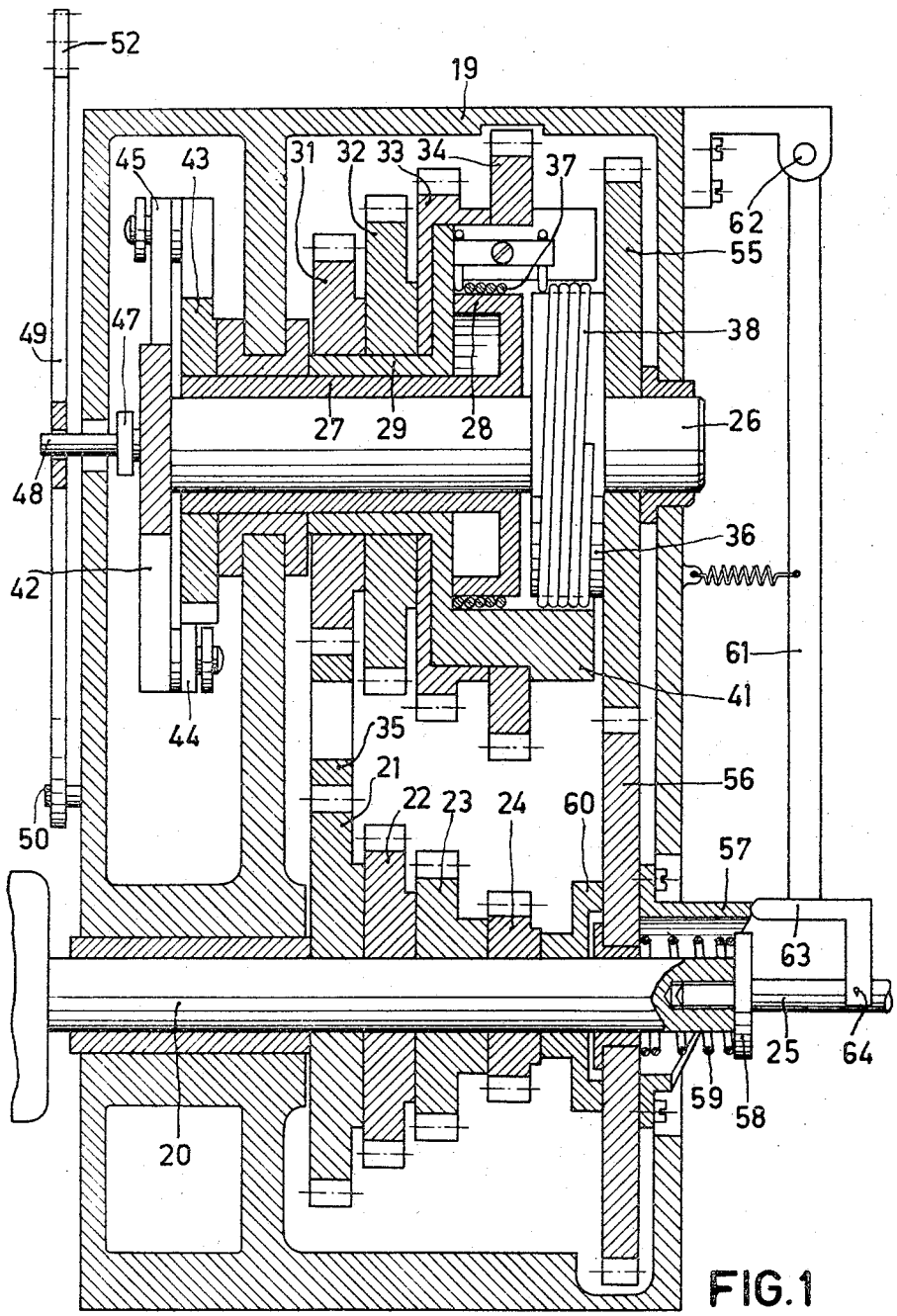
FIG. 1 is a cross sectional view of a presently preferred embodiment of a machine according to the invention.
Figure 2:
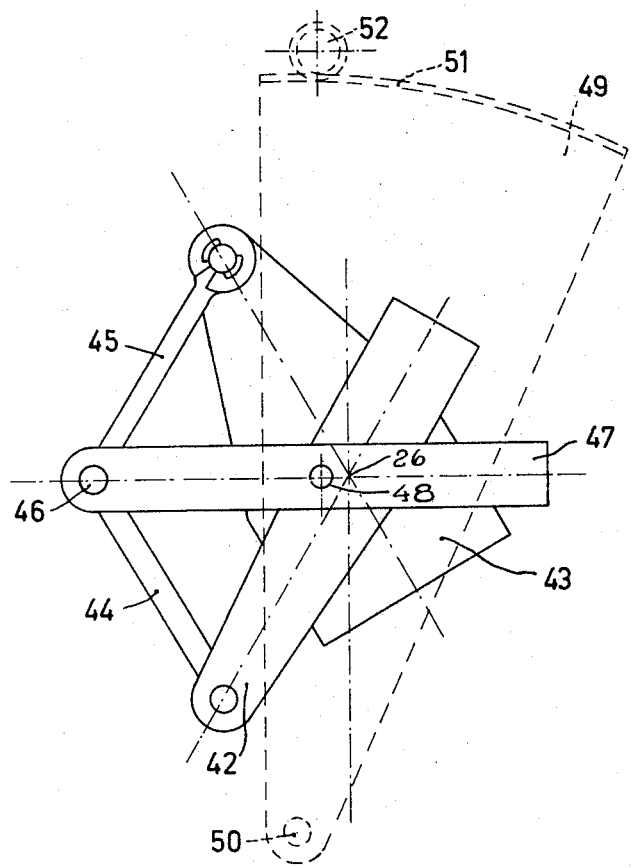
FIG. 2 is a side elevation of the speed-control member.

FIGS. 1 and 2 show a first embodiment of the winding machine. A housing 19 accommodates a drive shaft 20, on which four gear wheels 21, 22, 23 and 24 are rigidly secured. Said shaft is furthermore provided with a support 25 for the coil formers. A sleeve 27 surrounds the speed-control-shaft 26 in the housing, and a disc 28 is provided at one end of said sleeve. A second sleeve 29, to which gear wheels 31, 32, 33 and 34 are rigidly secured rotatably surrounds the sleeve 27. In known manner, one of the gear wheels 31 to 34 is capable of engaging a corresponding gear wheel of the drive set 21 to 24, with the aid of an intermediate wheel 35, which is secured to a movable holder (not shown).

The corresponding gear wheels 21 to 24 and 31 to 34 have a transmission ratio of 1:1, 1:1.5; 1:2 and 1:3 respectively, which are the ratios for the conventional winding patterns of universal coils.

The driven shaft 26 has furthermore rigidly secured to it a second disc 36. Each of the discs 28 and 36 is surrounded by a helical spring 37 and 38 respectively, which are each free at one end and having their other end secured in a recess of a flange 41 of the sleeve 29. The helical springs operate in known manner as slip couplings between the flange 41 and the discs 28 and 36. Since the distance between the flange 41 and the discs 28 and 36 hardly exceeds the diameter of the springs, the coupling will become substantially immediately operative, when the flange 41 rotates.

Referring now to FIGS. 1 and 2, the shaft 26 of the speed-control has rigidly secured to it a rod 42, whereas the sleeve 27 is provided with a rigidly secured rod 43. The arm 42 is pivoted to a rod 44 and the rod 43 to a rod 45. The rods 44 and 45 are united at their other ends by a pivotal shaft 46. Shaft 46 is coupled to eccentric arm 47; the latter of which is adapted to turn about a shaft 48. The shaft 48 is supported for movement and extends through the bore of a sector gear 49, which is rotatably connected by a shaft 50 to the housing 19. The sector gear 49 cooperates with a pinion 52. By turning the pinion 52 a displacement of the shaft 48 of the eccentric arm 47 is made which results in an adjustment of the value of the transmission ratio of the gears 21–24 and 31–34 and hence also of the winding step.

A gear wheel 55 is rigidly secured to the speed-control shaft 26 and engages a gear wheel 56 on the shaft 20, having the same number of teeth. A cam disc 57 is suitably connected with the gear wheel 56. Between the gear wheel 56 and a shoulder 58 of the coil holder 25 there is arranged a spring 59, which urges the gear wheel 56 with the cam disc 57 with slight pressure against a stop 60, rigidly secured to the main shaft 20. It is thus ensured that the cam disc 57 and the coil former are always at the same accurately defined distance from each other. A wire guide 61 is adapted to turn about a pin 62, journalled in the housing 19 and bears with the part 63 on the cam disc. The wire guide is provided with an opening 64, through which the wire is guided towards the coil.

Figure 4:
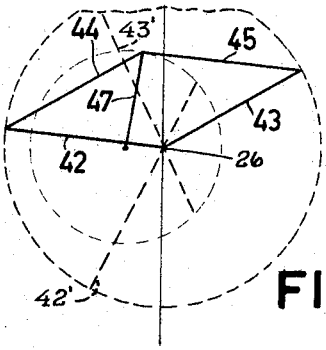
Figure 5:
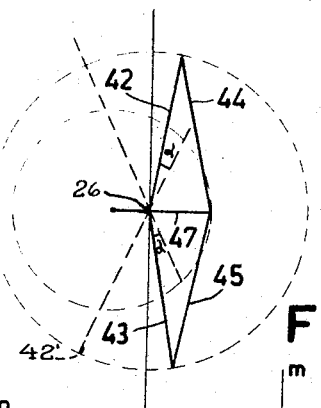
Figure 6:
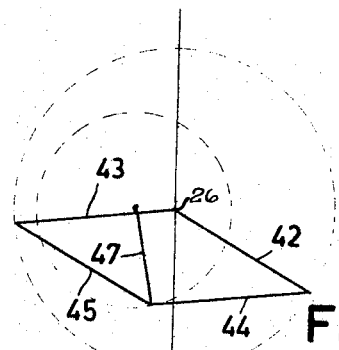

Movement of the speed-control members connected as described above will now be explained with reference to FIGS. 3 to 6. The ends of the rods 42 and 43 connected to one end of rods 44 and 45 all describe a circle $C_1$. The end of the eccentric arm 47 and the other ends of the rods 44 and 45 all described a circle $C_2$. When the rod 42 is turned in the direction of the arrow (FIG. 3), the rod 43 must move in the same direction. A comparison between the FIGS. 3, 4 and 5 will show that the rod 43 turns more rapidly between the positions of FIGS. 3 and 5 than the rod 42, since the arm 43 covers an angle of $180°+a$, whereas the rod 42 covers an angle of $180°-a$. In FIGS. 4 and 5 the broken lines indicate the position of rods 42 and 43 in FIG. 3. By using the couplings connected to the flange 41, that is the spring 37 surrounding the disc 28 and the spring 38 surrounding the disc 36 the rotatable flange 41 will become coupled with the slower disc, i.e. spring 38 will engage the disc 36 thereby driving shaft 26 and rod 42, while the higher-speed disc 28 connected with rod 43 will run free. When the rod 42 has reached the position shown in FIG. 5, the speed of the two rods 42 and 43 is exactly the same. Upon a further turn of the flange 41 from the position FIG. 5 to the position of FIG. 3, the rod 43, now the slow arm, is coupled via spring 37 with flange 41 while the arm 42, which now turns more rapidly drives shaft 26 via rod 43 and the speed control linkage of FIG. 2.

The gripping action of the springs is effected in the following manner. The springs 37 and 38 surround in close proximity the discs 28 and 36 respectively. If either of the discs 28 or 36 are rotating more slowly than rim 41, which retains the springs, a drag or friction force is applied to the internal diametral surface of the coiled springs. This force causes the coiled spring to reduce its diameter and thereby grip the slower disc. Correspondingly, if the disc is rotating at a speed higher than the rim 41, the spring will be forced to expand thereby negating any gripping action.

Figure 3:
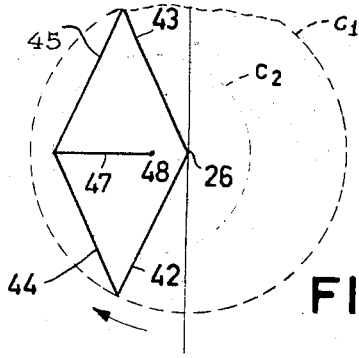
FIGS. 3 to 6 show diagrammatically various positions of the speed-control member in order of succession.

From the position of FIG. 3 to the position of FIG. 5 the rod 42 is coupled with the flange 41 via shaft 26, disc 36, and spring 38. Consequently, the flange 41 and the output shaft 26 which is rigidly connected with the rod 42, both cover an angle of $180°-a$. From the position of FIG. 5 to the position of FIG. 3, the rod 43 is coupled with the flange 41 via sleeve 27, disc 28 and spring 37. During the angular rotation of rod 43 between the position of FIG. 5 and the position of FIG. 3 the shaft 26 rotates through an angle of $180°+a$ (the angle through which rod 42 moves) and the flange 41 moves through an angle of $180°-a$. The transmission ratio between the flange 41, operating as a driving member, and the output speed-control shaft 26 is therefore equal to $360°/360°-2a$ at the instant that the rods 42 and 43 have completed one revolution. This ratio is the desired overall or average transmission ratio of the speed-control and is obtained by selecting a given distance between the axis shaft 48, about which the eccentric arm 47 is adapted to turn, and the axis of speed-control shaft 26.

Figure 7:
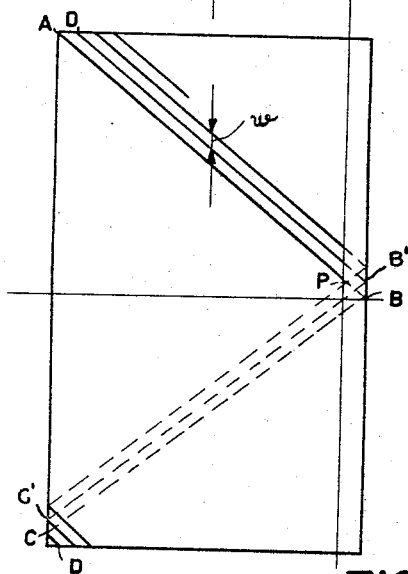
FIG. 7 shows a developed view of a coil wound on the machine shown in FIGS. 1 to 6.

FIG. 7 shows a developed view of part of a coil manufactured on the device described with reference to FIGS. 1 to 6. The transmission ratio of the gear wheels 21 to 24 and 31 to 34 is chosen to be 1:1 for the sake of clarity. That is, the gear wheel 21 engages, by means of the intermediate wheel 35, the gear wheel 31. The transmision ratio of the speed-control is adjusted to 1:0.96 by movement of the segment gear 49 via pinion 52 so that an overall transmission ratio of 1:0.96 is obtained. When the arm 42 has performed a complete revolution, the cam disc 57 has also turned one revolution and the wire guide 64 has moved once to and fro in the axial direction of the coil former.

The part AP of the first turn of FIG. 7 is wound with a transmission ratio of 1:1, since the arm 42 is rigidly connected with the speed-control shaft 26, and is driven by gears 21, 31, sleeve 29, flange 41 via spring 38 and disc 36. When the wire to be wound has reached the imaginary line $m$ on the coil former, the arm 42 has covered an angle of $180°-a$. The arm 43 is now coupled with the flange 41 via spring 37, disc 28 and sleeve 27 to which arm 43 is rigidly connected and the arm 42 now rotates more rapidly, as described above, as a result of which the speed-control shaft 26 and the flange 41 have a transmission ratio deviating from 1:1 in order to obtain the desired distance between successive turns determined by the winding step $w$. The part of the turn PBC, which is wound from the position of the arms 42, 43 in FIG. 5 to their position in FIG. 3, is shown in broken lines. At C the arm 42 is recoupled with the flange 41 and the second turn D, $B^1$, $C^1$ is wound. It will be apparent from the drawing that the arm 43 is coupled with the flange 41 each time the wire to be wound crosses the imaginary line $m$, that is to say always in the same position of the speed-control shaft 26.

The system described above does not deviate from the selected transmission ratio. Only during the small angular displacement of the flange 41 through which the springs 37 and 38 are caused to engage the disc 28 or 36, might the transmission ratio be slightly varied due to slip. The springs, however, act very quickly (within 1° of angular displacement of the flange 41), since the distance between the flange 41 and the discs 28 and 36 exceeds the spring diameter only very slightly. Moreover, the angular displacement of the flange 41, required to actuate the couplings, is substantially constant, so that any deviation which may occur is constant and can be compensated by a slight corrective displacement of the shaft 48 of the eccentric arm 47. Consequently, the resultant deviation from the transmission ratio of the speed-control member is negligible. The device according to the invention therefore also provide accurately wound coils of a very thin wire, for example, wire of a diameter of $40\mu$, while the electric properties of a large number of mass produced coils exhibit a high degree of constancy.

Figure 8:
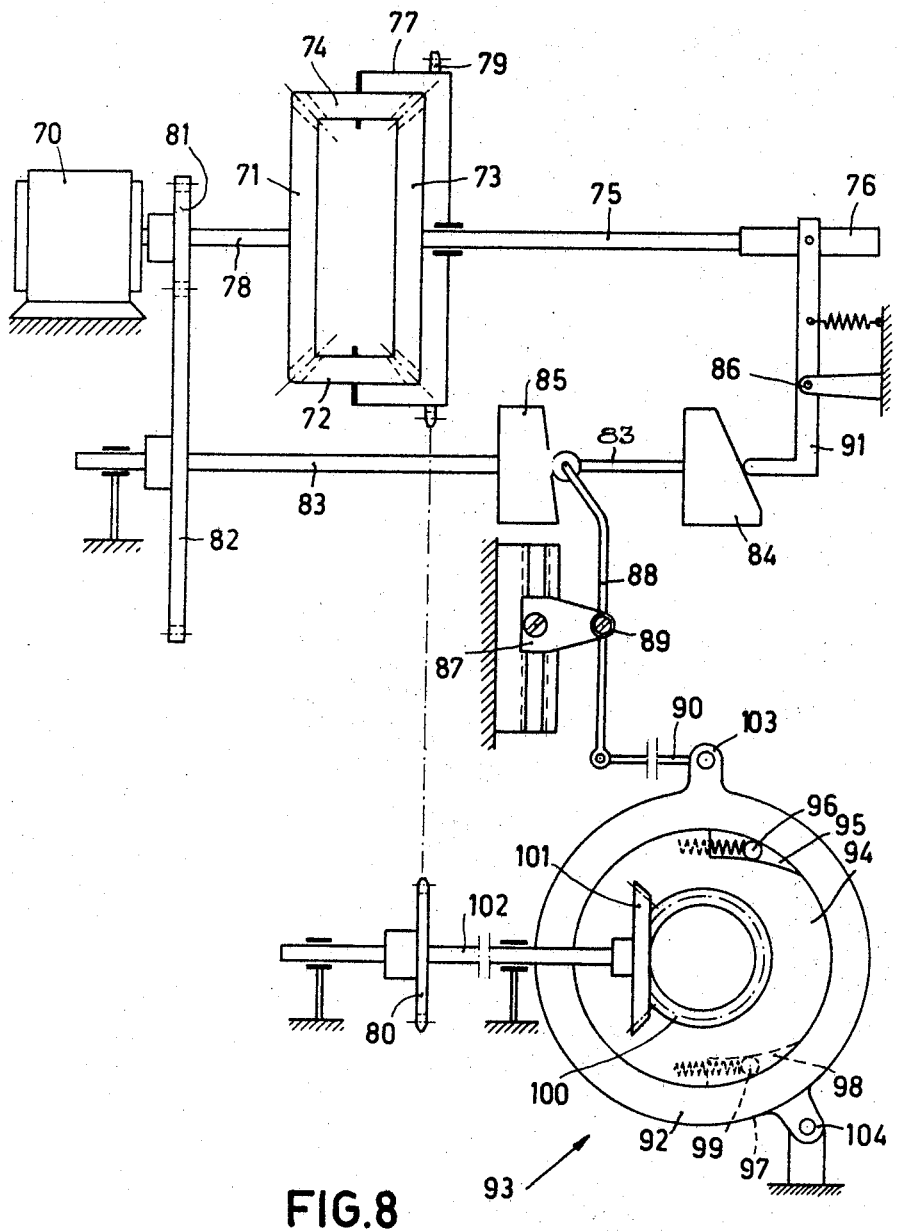
FIG. 8 shows a further embodiment of the machine according to the invention.

FIG. 8 shows diagrammatically another embodiment of a machine according to the invention. A differential mechanism comprises bevel gear wheels 71 to 74. The drive wheel 71 is coupled through a driving shaft 78 with a motor 70. The driven wheel 73 is linked to a shaft 75, on which the coil former 76 is arranged. The idler wheels 72 and 74 are mounted on a yoke or housing 77, which is journalled on the shaft 75. The housing 77 is provided with a toothed rim 79, which engages a gear 80, for example, by intermediate wheels or a chain indicated by broken lines.

The drive shaft 78 is provided with a gear wheel 81, rigidly secured thereto and engaging a gear wheel 82 rigidly secured to a cam shaft 83. The transmission ratio between the gear wheels 81 and 82 is, as is shown in the drawing, 1:3. The shaft 83 is provided with cams 84 and 85. The cam 84 imparts to and fro movement to a wire guide 91, which is pivotally disposed at 86. The cam 85 imparts reciprocal movement to a lever 88, which is pivotable about a shaft 89, secured to an adjustable slide 87. An arm 90, connected with the lever 88, is secured to an ear 103 of a ring 92, which forms part of a slip coupling generally designated 93. Within the ring 92 a disc 94 is adapted to rotate, said disc having a recess 95 for accommodating a spring-loaded ball 96. The ball 96 constitutes the coupling element between the ring 92 and the disc 94. The disc 94 is also surrounded by a second ring 97, similar to ring 92 which is located behind the ring 92 in the figure. The disc 94 also has a second recess 98, accommodating a spring-loaded ball 99. The ball 99 operates as a coupling element between the second ring 97 and the disc 94. The ring 97 is rigidly secured by an ear 104 fixed to the frame of the machine. The disc 94 is provided with a bevel gear wheel 100, which engages a bevel gear wheel 101. The bevel gear wheel 101 is secured to a shaft 102, on which the gear wheel 80 is arranged.

Operation is as follows: the wheel 71 of the differential rotates at the speed of the motor 70. The cam shaft 83 rotates at one third this number of revolutions due to the choice of the gear wheels 81 and 82. The cam 85 causes a counterclockwise rotation of the ring 92 during half of each revolution through the lever 88 and the arm 90. The ball 96 is released or simply rolls freely so that it does not actuate the disc 94. The fixed ring 97 cooperating with the ball 99 on acting on the disc 94, prevents the disc 94 from turning to the left or counterclockwise. The housing 77 stands still during the counterclockwise part of the revolution and therefore the transmission ratio between the output shaft 75 of the differential speed-control and the cam shaft 83 is 1:3. The wire guide 91 thus performs one reciprocatory or to and fro movement during three revolutions of the coil former 76.

The cam 85, however, imparts, during the other half of its revolution, a right-hand rotation to the ring 92. The ball 96 then carries along the disc 94 and movement of the disc 94 is transferred through the bevel gear wheels 100, 101, to the gear wheels 80, 79 and to the housing 77 to the differential mechanism. Rotation of housing 77 is superimposed through gears 72, 74 and 73 on the rotation of the shaft 75.

During this half of the revolution of cam 85 the transmission ratio between the cam shaft 83 and the shaft 75 is not 1:3 and as a result the wire guide moves at a different speed than before.

Figure 9:
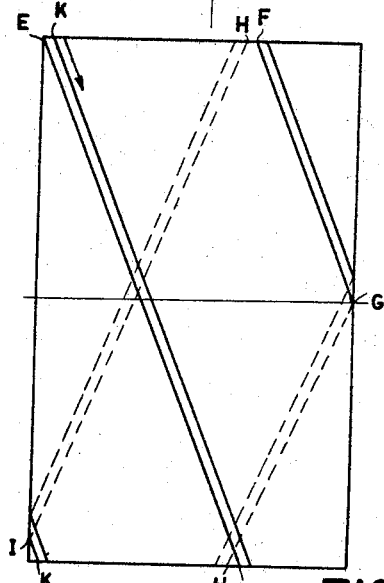
FIG. 9 shows a developed view of part of a coil wound on the machine shown in FIG. 8.

The value of the average transmission ratio can be adjusted by changing the location of the slide 87 carrying pivot 89. The stroke of the lever 88 and hence the value of the angular displacement of the ring 92 are thus varied. The coil thus wound has the shape shown in FIG. 9. The transmission ratio is chosen to be 1:2.88 by moving slide 87 so that the winding pattern is different from the coil shown in FIG. 7. Since the direction of movement of the lever 88 reverses exactly each half revolution of the cam 85, the portion EFG of each turn will be wound with a transmission ratio 1:3, and the portion GHI with a different transmission ratio, the overall transmission ratio being just 1:2.88.

While I have shown and described the preferred embodiment of my invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What is claimed as new and useful and secured by Letters Patent of the United States is:

1. Apparatus for winding a universal coil, said apparatus comprising a rotatable coil former means and a wire guide means reciprocally movable axially relative to said coil former, and means for driving said coil former and wire guide; said driving means comprising, input drive means providing a given speed, slip coupling means driven by said input driven means, and speed control means driven by said slip coupling means, and output shaft by said input drive means, and speed control means said input drive means being connected to said output shaft by said slip coupling means for driving said output shaft for substantially half a revolution of said output shaft, and said input drive means being connected to said speed control means by said slip coupling for the remaining revolution of said shaft.

2. Apparatus according to claim 1 wherein said slip coupling means comprises a first slip coupling member and a second slip coupling member, one of said first and second slip coupling members coupling said input drive means and said output shaft directly and the other of said first and second slip coupling members coupling said input drive means and said speed control means for driving said output shaft at a speed other than said given speed.

3. Apparatus according to claim 2 with the addition of adjusting means connected with said slip coupling means for varying the relative duration of operation of said first and second slip coupling members.

4. Apparatus according to claim 2 wherein said wire guide means connected with said output shaft for non-uniform reciprocal movement thereof, and said coil former is connected with said input drive means for uniform movement thereof.

5. Apparatus according to claim 2 wherein said wire guide means is connected with said input drive means for uniform movement thereof and said coil former means is connected with said output shaft for non-uniform movement thereof.

6. Apparatus according to claim 4 wherein said speed control means comprises a rotatable rod system, means for rotatably mounting said rod system; said rod system comprisng a first rod rigidly connected with said output shaft, a second rod pivotally connected at one end with said first rod, a third rod pivotal with respect to said output shaft, a fourth rod having one end pivotally connected with said third rod at one end and having its other end pivotally connected with the other end of said second rod, an adjusting means is connected with said slip coupling means for varying the duration of operation of said first and second slip coupling members, said adjusting means pivotally interconnecting said second and fourth rods at the connection of said other ends thereof with said slip coupling means, means connecting both said first and third rods with said slip coupling means; one of said first and second slip coupling members being connected with one of said first and third rods for connecting said input drive means and said output shaft directly and said other slip coupling member being connected with the other of said first and third rods for connecting said output shaft and input drive means with said speed control means whereby said first and third rods are alternatively coupled with said input drive means for a portion of a revolution of said output shaft determined by said adjusting means.

7. Apparatus according to claim 6 wherein said adjusting means comprises an eccentric arm and means for varying the length of said arm.

References Cited

UNITED STATES PATENTS 2,533,382   12/1950   Lorenz _____ 242—25
2,699,297   1/1955   Weinreich et al. _____ 242—9

STANLEY N. GILREATH, *Primary Examiner.*

FRANK J. COHEN, N. L. MINTZ, *Assistant Examiners.*

UNITED STATES PATENT OFFICE
CERTIFICATE OF CORRECTION

Patent No. 3,329,358            July 4, 1967

Wilhelmus Leonard Louis Lenders

It is certified that error appears in the above identified patent and that said Letters Patent are hereby corrected as shown below:

Column 6, line 5, "driven" should read -- drive --; lines 7 and 8, cancel "by said input drive means, and speed control means said input drive means being connected to said output" and insert -- means in connected relation to said speed control means; said input drive means being connected to said output --.

Signed and sealed this 29th day of July 1969.

(SEAL)
Attest:

Edward M. Fletcher, Jr.

Attesting Officer

WILLIAM E. SCHUYLER, JR.

Commissioner of Patents